United States Patent [19]

Potter et al.

[11] Patent Number: 5,901,307
[45] Date of Patent: May 4, 1999

[54] PROCESSOR HAVING A SELECTIVELY CONFIGURABLE BRANCH PREDICTION UNIT THAT CAN ACCESS A BRANCH PREDICTION UTILIZING BITS DERIVED FROM A PLURALITY OF SOURCES

[75] Inventors: Terence Matthew Potter; Paul Charles Rossbach; Thomas Luther Thomas, Jr., all of Austin, Tex.

[73] Assignees: International Business Machines Corporation, Armonk, N.Y.; Motorola, Inc., Schaumburg, Ill.

[21] Appl. No.: 08/684,720

[22] Filed: Jul. 22, 1996

[51] Int. Cl.⁶ ...................................................... G06F 9/32
[52] U.S. Cl. ........................................... 395/587; 395/585
[58] Field of Search ................................... 395/383, 376, 395/800.23, 586, 587, 585

[56] References Cited

U.S. PATENT DOCUMENTS

| | | | |
|---|---|---|---|
| 5,454,117 | 9/1995 | Puziol et al. | 395/800.23 |
| 5,507,028 | 4/1996 | Liu | 395/383 |
| 5,574,871 | 11/1996 | Hoyt et al. | 395/376 |
| 5,577,217 | 11/1996 | Hoyt et al. | 395/376 |
| 5,584,001 | 12/1996 | Hoyt et al. | 395/585 |
| 5,606,676 | 2/1997 | Grochowski et al. | 395/586 |

*Primary Examiner*—Thomas C. Lee
*Assistant Examiner*—Gautam R. Patel
*Attorney, Agent, or Firm*—Casimer K. Salys; Brian F. Russell; Andrew J. Dillon

[57] ABSTRACT

A processor and method for speculatively executing a branch instruction are disclosed. The processor includes a branch prediction unit for predicting a resolution of a speculative branch instruction, which is selectively configurable such that resolution of the speculative branch instruction is predicted in response to only an address of the speculative branch instruction or in response to branch history of at least one previously executed branch instruction. The processor also includes an address calculation unit for determining a target address in response to the predicted resolution of the speculative branch instruction. In one embodiment, the processor further includes configuration logic for dynamically configuring the branch prediction logic.

23 Claims, 6 Drawing Sheets

PROCESSOR HAVING A SELECTIVELY CONFIGURABLE BRANCH PREDICTION UNIT THAT CAN ACCESS A BRANCH PREDICTION UTILIZING BITS DERIVED FROM A PLURALITY OF SOURCES

BACKGROUND

1. Technical Field

The present specification relates in general to a method and system for data processing and, in particular, to a processor and method for speculatively executing a branch instruction. Still more particularly, the present specification relates to a processor and method for speculatively executing a branch instruction, wherein the processor includes a selectively configurable branch prediction unit.

2. Description of the Related Art

A state-of-the-art superscalar processor can comprise, for example, an instruction cache for storing instructions, an instruction buffer for temporarily storing instructions fetched from the instruction cache for execution, one or more execution units for executing sequential instructions, a branch processing unit (BPU) for executing branch instructions, a dispatch unit for dispatching sequential instructions from the instruction buffer to particular execution units, and a completion buffer for temporarily storing sequential instructions that have finished execution, but have not completed.

Branch instructions executed by the branch processing unit (BPU) of the superscalar processor can be classified as either conditional or unconditional branch instructions. Unconditional branch instructions are branch instructions that change the flow of program execution from a sequential execution path to a specified target execution path and which do not depend upon a condition supplied by the occurence of an event. Thus, the branch specified by an unconditional branch instruction is always taken. In contrast, conditional branch instructions are branch instructions for which the indicated branch in program flow may be taken or not taken depending upon a condition within the processor, for example, the state of specified condition register bits or the value of a counter. Conditional branch instructions can be further classified as either resolved or unresolved, based upon whether or not the condition upon which the branch depends is available when the conditional branch instruction is evaluated by the branch processing unit (BPU). Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to minimize execution stalls, some processors speculatively execute unresolved branch instructions by predicting whether or not the indicated branch will be taken. Utilizing the result of the prediction, the fetcher is then able to fetch instructions within the speculative execution path prior to the resolution of the branch, thereby avoiding a stall in the execution pipeline in cases in which the branch is subsequently resolved as correctly predicted. Conventionally, prediction of unresolved conditional branch instructions has been accomplished utilizing static branch prediction, which predicts resolutions of branch instructions based upon criteria determined prior to program execution, or dynamic branch prediction, which predicts resolutions of branch instructions by reference to branch history accumulated on a per-address basis within a branch history table. While conventional static and dynamic branch prediction methodologies have reasonable prediction accuracies for some performance benchmarks, the severity of the performance penalty incurred upon misprediction in state-of-the-art processors having deep pipelines and high dispatch rates necessitates increased prediction accuracy.

In response to the need for improved prediction accuracy, several two-level branch prediction methodologies have been proposed. For example, in one two-level dynamic branch prediction scheme, the first level of branch history comprises the execution history of the last K branch instructions and the second level of branch history comprises the branch behavior of the last L occurrences of the specific pattern of the last K branch instructions. Utilizing such two-level branch prediction schemes can result in prediction accuracies as high as 98% for selected performance benchmarks if the amount of branch history maintained at the first and second levels is optimized for the selected performance benchmarks. However, predetermining the amount of branch history maintained at each level based upon the prediction accuracy achieved for particular performance benchmarks does not necessarily ensure adequate prediction accuracy for multiple programs exhibiting diverse branch behaviors. Furthermore, the storage cost of the theoretically optimal amount of branch history may be prohibitive.

Therefore, in order to achieve adequate branch prediction accuracy at a reasonable cost for programs exhibiting a variety of diverse branch behaviors, a configurable two-level branch prediction mechanism is needed. In particular, a two-level branch prediction mechanism is needed that is dynamically configurable.

SUMMARY

It is therefore one object of the present disclosure to provide an improved method and system for data processing.

It is another object of the present disclosure to provide an improved processor and method for speculatively executing a branch instruction.

It is yet another object of the present disclosure to provide an improved processor and method for speculatively executing a branch instruction, wherein the processor includes a selectively configurable branch prediction unit.

The foregoing objects are achieved as is now described. A processor and method for speculatively executing a branch instruction are disclosed. The processor includes a branch prediction unit for predicting a resolution of a speculative branch instruction, which is selectively configurable such that resolution of the speculative branch instruction is predicted in response to only an address of the speculative branch instruction or in response to branch history of at least one previously executed branch instruction. The processor also includes an address calculation unit for determining a target address in response to the predicted resolution of the speculative branch instruction. In one embodiment, the processor further includes configuration logic for dynamically configuring the branch prediction logic.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
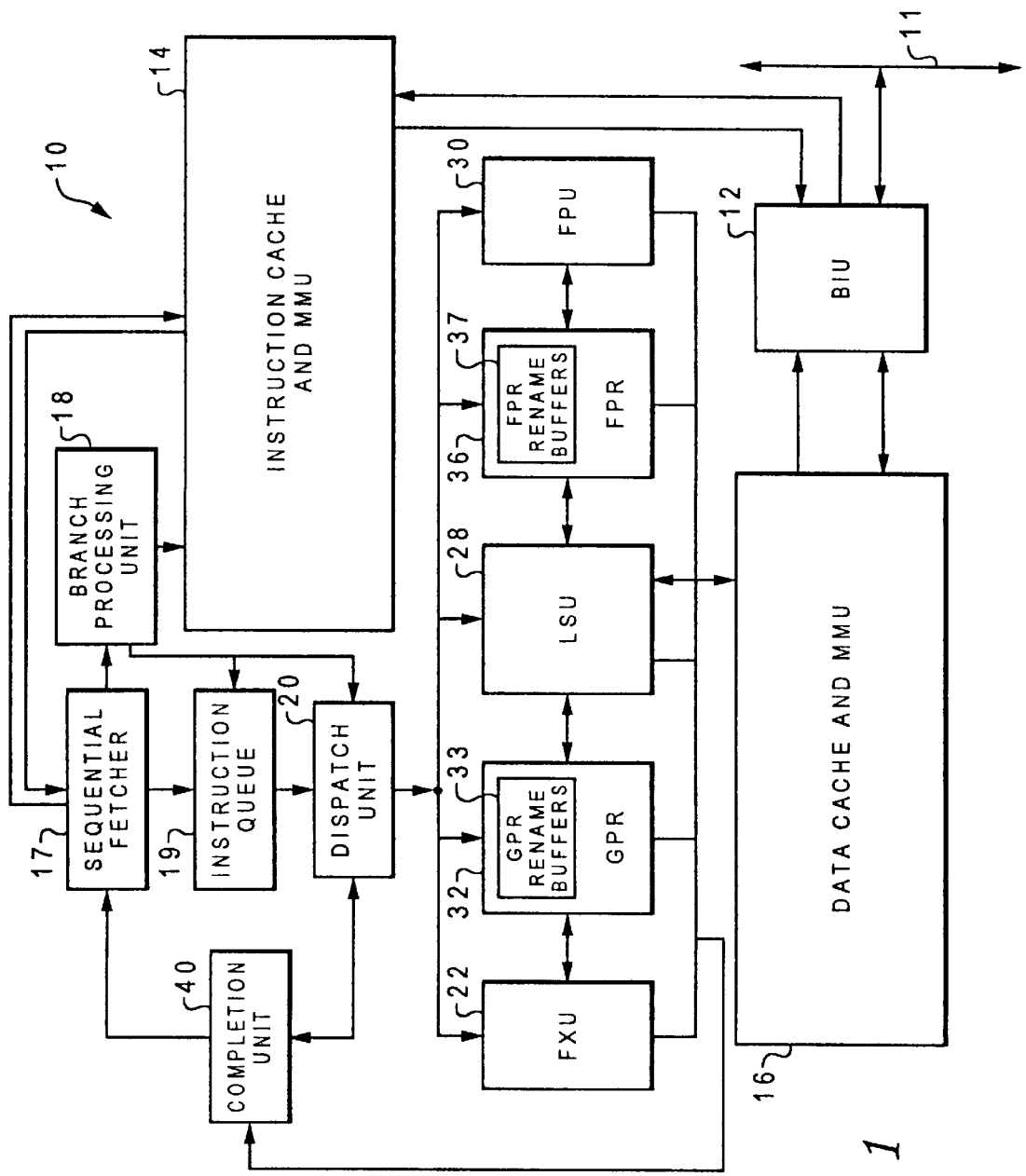
FIG. 1 depicts an illustrative embodiment of a processor having a configurable two-level branch prediction mechanism.

With reference now to the figures and in particular with reference to FIG. 1, there is depicted a block diagram of an illustrative embodiment of a processor, indicated generally at 10, for processing information in accordance with the invention recited within the appended claims. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate that other suitable processors can be utilized. As illustrated in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a data processing system.

BIU 12 is connected to instruction cache 14 and data cache 16 within processor 10. High-speed caches, such as instruction cache 14 and data cache 16, enable processor 10 to achieve relatively fast access times to a subset of data or instructions previously transferred from main memory to caches 14 and 16, thus improving the performance of the data processing system. Instruction cache 14 is further coupled to sequential fetcher 17, which fetches one or more instructions for execution from instruction cache 14 during each cycle. Sequential fetcher 17 transmits instructions fetched from instruction cache 14 to both branch processing unit (BPU) 18 and instruction queue 19, which decode the instructions to determine whether the instructions are branch or sequential instructions. Branch instructions are retained by BPU 18 for execution and cancelled from instruction queue 19; sequential instructions, on the other hand, are cancelled from BPU 18 and stored within instruction queue 19 for subsequent execution by other execution circuitry within processor 10. As noted above, branch instructions executed by BPU 18 can be categorized as either conditional or unconditional; conditional branch instructions can be further categorized as resolved or unresolved. Conditional branch instructions can depend upon the state of particular bits with a condition register (CR), which are set or cleared in response various conditions within the data processing system, and/or upon the value stored within an unillustrated count register (CTR).

In the depicted illustrative embodiment, in addition to BPU 18, the execution circuitry of processor 10 comprises multiple execution units for sequential instructions, including fixed-point unit (FXU) 22, load-store unit (LSU) 28, and floating-point unit (FPU) 30. As is well-known to those skilled in the computer arts, each of execution units 22, 28, and 30 typically executes one or more instructions of a particular type of sequential instructions during each processor cycle. For example, FXU 22 performs fixed-point mathematical and logical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 typically performs single and double-precision floating-point arithmetic and logical operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 typically executes floating-point and fixed-point instructions which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed opportunistically by FXU 22, LSU 28, and FPU 30 in any order as long as data dependencies are observed. In addition, instructions are processed by each of FXU 22, LSU 28, and FPU 30 at a sequence of pipeline stages. As is typical of many high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. As noted above, sequential instructions fetched from instruction cache 14 are stored by sequential fetcher 17 within instruction queue 19, while branch instructions are removed (folded out) from the sequential instruction stream. As described below, branch instructions are executed by BPU 18, which includes facilities that enable BPU 18 to speculatively execute unresolved conditional branch instructions with high prediction accuracy.

During the decode/dispatch stage, dispatch unit 20 decodes and dispatches one or more instructions from instruction queue 19 to execution units 22, 28, and 30. During the decode/dispatch stage, dispatch unit 20 also allocates a rename buffer within GPR rename buffers 33 or FPR rename buffers 37 for each dispatched instruction's result data. According to a the depicted illustrative embodiment, instructions dispatched by dispatch unit 20 are also passed to a completion buffer within completion unit 40. Processor 10 tracks the program order of the dispatched instructions during out-of-order execution utilizing unique instruction identifiers.

During the execute stage, execution units 22, 28, and 30 execute sequential instructions received from dispatch unit 20 opportunistically as operands and execution resources for the indicated operations become available. Each of execution units 22, 28, and 30 are preferably equipped with a reservation station that stores instructions dispatched to that execution unit until operands or execution resources become available. After execution of an instruction has terminated, execution units 22, 28, and 30 store data results of the instruction within either GPR rename buffers 33 or FPR rename buffers 37, depending upon the instruction type. Then, execution units 22, 28, and 30 notify completion unit 40 which instructions stored within the completion buffer of completion unit 40 have finished execution. Finally, instructions are completed by completion unit 40 in program order by transferring data results of the instructions from GPR rename buffers 33 and FPR rename buffers 37 to GPRs 32 and FPRs 36, respectively.

Figure 2:
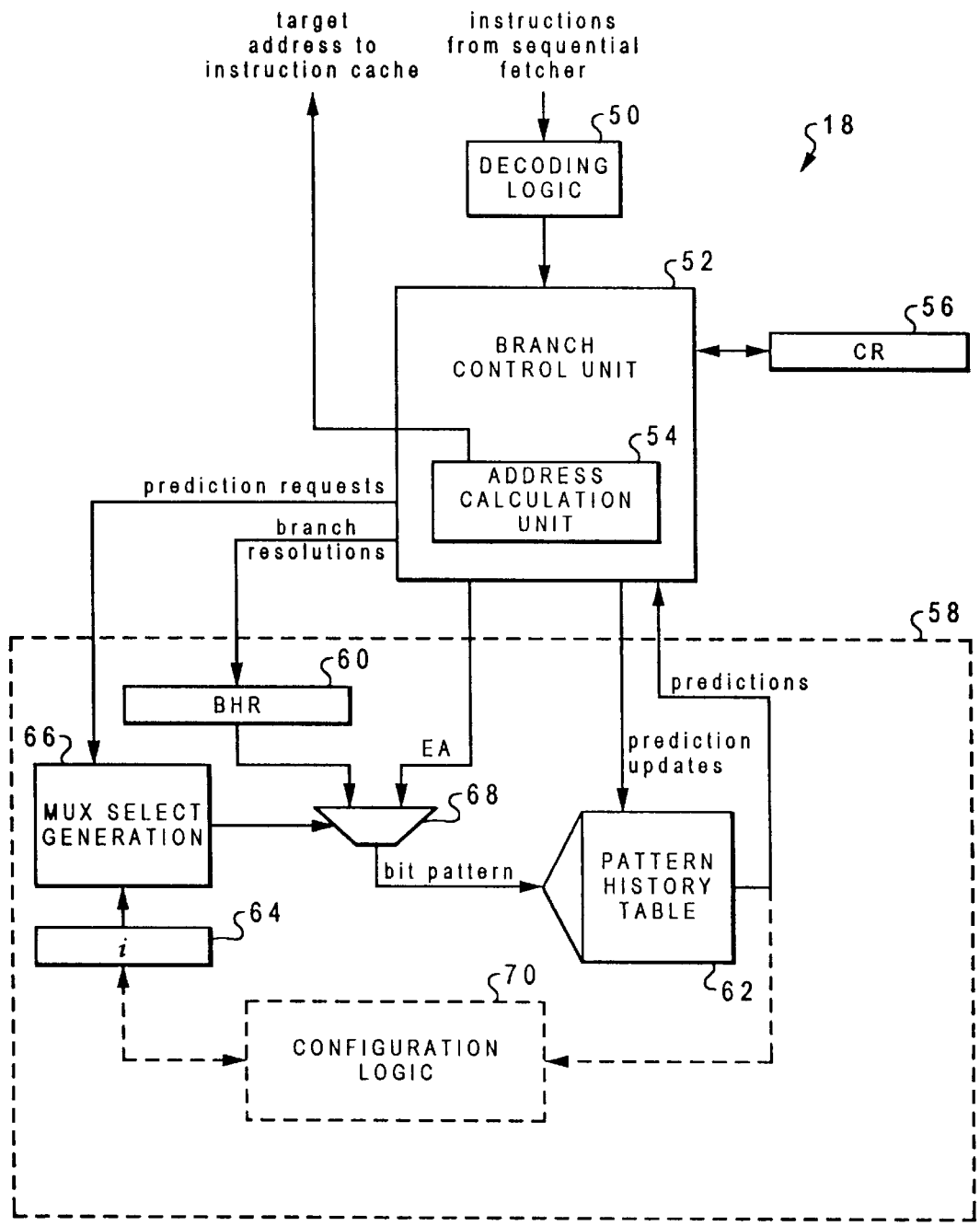
FIG. 2 illustrates a more detailed block diagram representation of the branch processing unit of the processor illustrated in FIG. 1.

Referring now to FIG. 2, there is depicted a more detailed block diagram representation of BPU 18 within processor 10. As illustrated, BPU 18 includes decoding logic 50, which decodes each instruction received by BPU 18 from sequential fetcher 17 to determine whether or not the instruction is a branch instruction, and if so, what type of branch instruction. In addition, BPU 18 includes branch control unit 52, which executes each branch instruction identified by decode logic 50 through calculating the effective address (EA) of a target execution path utilizing address calculation unit 54. As depicted, branch control unit 52 is coupled to condition register (CR) 56, which comprises a register including several bits fields that are set or cleared in response to various conditions within the data processing system. Branch control unit 52 references CR 56 to resolve each branch conditional instruction that depends upon the occurrence of an event that sets or clears a bit field within CR 56.

Still referring to FIG. 2, BPU 18 further includes branch prediction unit 58, which is utilized by BPU 18 to predict resolutions of unresolved conditional branch instructions that depend upon the state of a bit field within CR 56. As illustrated, branch prediction unit 56 comprises branch history register (BHR) 60, which stores a first level of branch history, pattern history table (PHT) 62, which stores a second level of branch history, length register 64, MUX select generation logic 66, multiplexer 68, and optional configuration logic 70. In the depicted embodiment, BHR 60 comprises a K-bit register that stores the branch history of the last K branch instructions encountered. In response to receipt of an indication from branch control unit 52 that a branch was taken, BHR 60 records a "1"; if branch control unit 52 indicates that a branch was not taken, BHR 60 records a "0". Thus, BHR 60 stores a first level of branch history which is global, that is, shared by all branch instructions. In an alternative embodiment, BHR 60 may be replaced by a branch history table (BHT) that stores branch history for each branch instruction address (a per-address BHT) or for each set of branch instruction addresses or opcodes (a per-set BHT).

A second level of branch history is maintained within pattern history table (PHT) 62, which stores a plurality of branch predictions that are each associated with a unique bit pattern. For example, an exemplary embodiment of PHT 62 may include $2^K$ two-bit branch predictions, which are each uniquely identified by an associated K-bit pattern. Thus, in response to receipt of a K-bit pattern, PHT 62 supplies the associated branch prediction to branch control unit 52. Branch control unit 52 updates the branch prediction associated with a particular bit pattern following the resolution of a speculatively executed branch instruction as either correctly predicted or mispredicted. For example, in an implementation of PHT 62 in which two-bit branch predictions are associated with each bit pattern, the states "00" and "01" represent a prediction of not taken, and the remaining states "10" and "11" represent a prediction of taken. In response to a resolution of a branch prediction as correctly predicted, branch control unit 52 increments the two-bit branch prediction value if the value is less than "11". Similarly, branch control unit 52 decrements a two-bit branch prediction value in response to a misprediction if the prediction value is greater than "00".

The bit pattern utilized to access a branch prediction within PHT 62 is selected based upon the value i stored within length register 64. The value i specifies the number of low-order bits within BHR 60 that MUX select generation logic 66 causes multiplexer 68 to select in response to receipt of a prediction request from branch control unit 52. Multiplexer 68 selects the remaining bits within the bit pattern used to access PHT 62 from the low-order bits of the effective address (EA) of the speculative branch instruction. Thus, based upon the value i stored within length register 64, PHT 62 is accessed by a bit pattern comprising a selected amount of branch history and a selected number of bits within the address of the speculative branch instruction. By selecting appropriate numbers of branch history bits and address bits to access PHT 62, PHT 62 can be selectively configured to enhance branch prediction accuracy.

Figure 3:
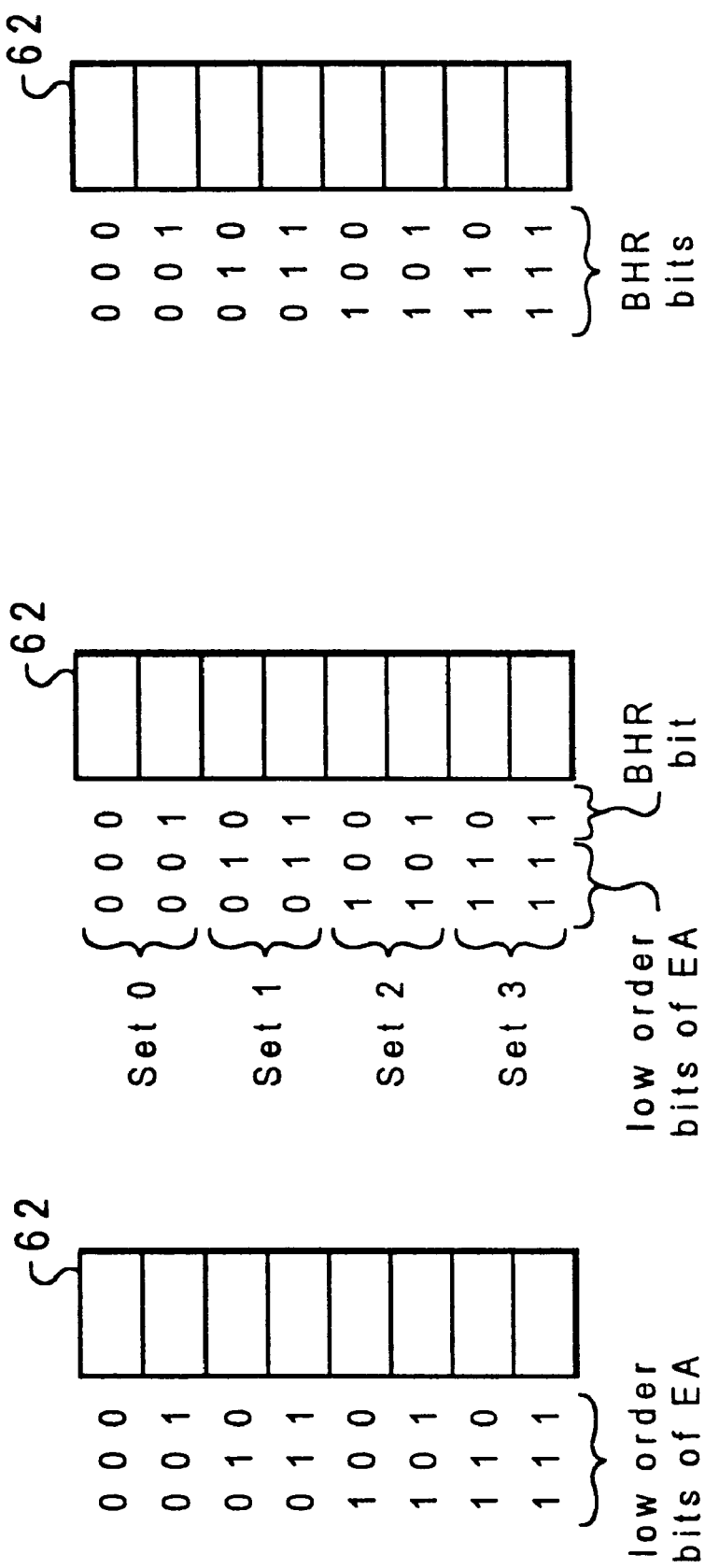
FIGS. 3A, 3B and 3C depict three configurations of the pattern history table illustrated in FIG. 2, wherein the pattern history table is configured such that branch resolution predictions are made on a per-address, per-set, and global basis, respectively.

With reference now to FIGS. 3A–3C, there are depicted three configurations of an illustrative embodiment of PHT 62 in which PHT 62 stores 8 two-bit branch predictions that are each associated with a 3-bit pattern. Although the illustrative embodiment of PHT 62 stores too few branch predictions to achieve a high prediction accuracy, the illustrative embodiment clearly indicates how PHT 62 is configured into multiple diverse configurations by selecting differing sources for the bits utilized to select a branch prediction. With reference first to FIG. 3A, there is illustrated a first configuration of PHT 62 in which bit patterns are associated with branch predictions on a per-address basis. In the first configuration, a bit pattern utilized to index into PHT 62 is determined by selecting the three low-order bits of the EA of the speculative branch instruction. Referring now to FIG. 3B, there is depicted a second configuration of PHT 62 in which bit patterns are associated with branch predictions on a per-set basis. In the second configuration of PHT 62 illustrated in FIG. 3B, one of the four sets of branch predictions is selected by the two low-order bits of the EA of the branch instruction address. A particular branch prediction is selected within the set by the low-order bit of BHR 60, which specifies the history of the immediately preceding branch instruction. Finally, FIG. 3C depicts a third configuration of PHT 62 in which bit patterns are associated with branch predictions on a global basis. Thus, in the third configuration depicted in FIG. 3C, a branch prediction is selected by the resolutions of the last three branch instructions executed and does not depend upon the address of the particular speculative branch instruction. As should thus be apparent from FIGS. 3A–3C, PHT 62 can be configured in a number of diverse configurations, which permit a branch prediction to be selected utilizing an optimum amount of branch history.

Figure 4:
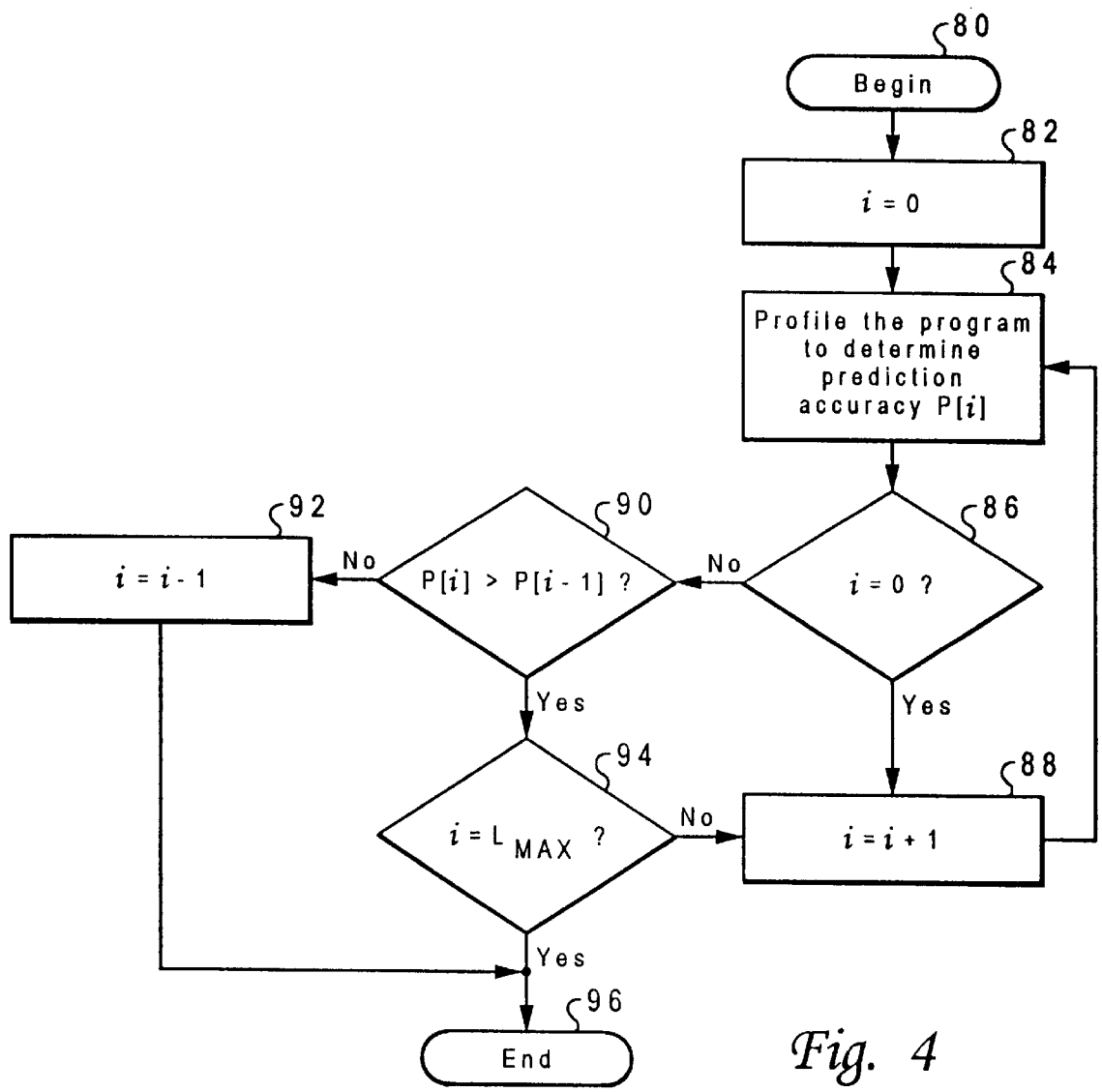
FIG. 4 is a flowchart of a method for statically determining an optimal amount of branch history utilized to predict branch resolutions for a particular application.

Referring now to FIG. 4, there is depicted a flowchart of an illustrative embodiment of a method for statically determining the optimal amount of branch history to utilize in predicting the resolution of speculative branch instructions for a particular application. As illustrated, the process begins at block 80 and thereafter proceeds to block 82, which illustrates setting i, the amount of branch history utilized to access PHT 62, to zero. The process then proceeds from block 82 to block 84, which depicts profiling the program to determine the prediction accuracy P[i] achieved utilizing the current value of i. Next, the process passes to block 86, which depicts a determination of whether or not i is equal to zero. In response to a determination that i is equal to zero, the process passes to block 88, which illustrates incrementing i. The process then returns from block 88 to block 84, which has been described.

Returning to block 86, if a determination is made that i is not equal to zero, the process proceeds to block 90, which illustrates a determination of whether or not the prediction accuracy achieved utilizing the current value of i is greater than the prediction accuracy achieved utilizing the immediately preceding value of i. If not, the process passes to block 92, which illustrates decrementing i. Thereafter, the process passes to block 96 and terminates. However, in response to a determination at block 90 that the prediction accuracy achieved utilizing the current value of i is greater than that achieved utilizing the previous value of i, the process passes to block 94, which depicts a determination of whether or not i is set to a maximum length. For example, in the previously described embodiment of branch prediction unit 58 in which BHR 60 is K bits in length, block 94 illustrates a determination of whether or not i is equal to K. If a determination is made at block 94 that i is not set to the maximum length, i is incremented at block 88, and the process returns to block 84, which has been described. However, if a determination is made at block 94 that i is set to the maximum length, the process terminates at block 96. Thus, by implementing the process depicted in FIG. 4 as a component of a standard program profiling routine, PHT 62 can be selectively configured to maximize prediction accuracy by setting length register 64 to an optimal value.

Figure 5:
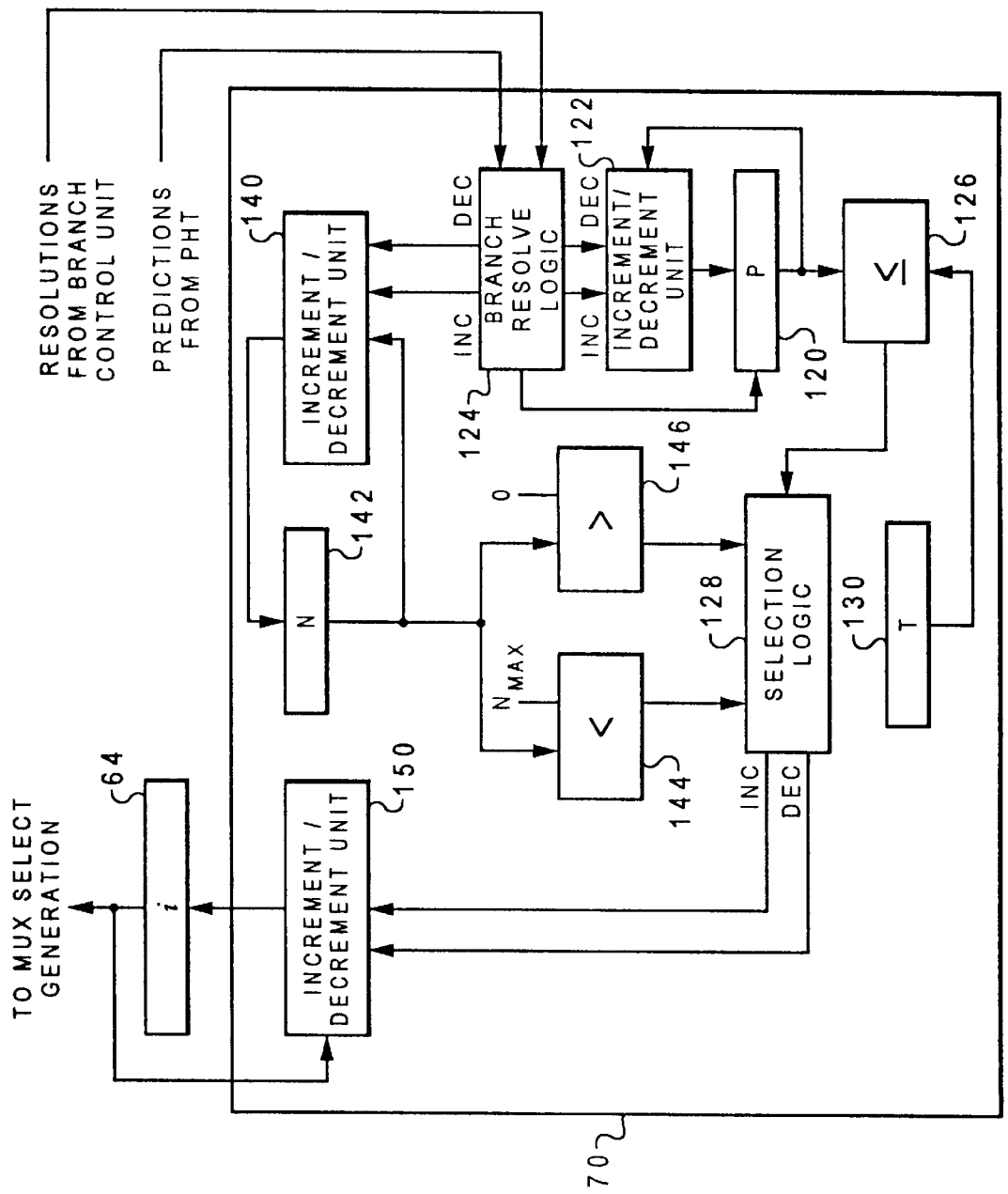
FIG. 5 is a block diagram depiction of an illustrative embodiment of the optional configuration logic within the branch processing unit depicted in FIG. 2.

With reference now to FIG. 5, there is depicted an illustrative embodiment of configuration logic 70, which can be optionally implemented within branch prediction unit 58 in order to dynamically determine an optimal amount of branch history utilized to predict branch resolutions. As illustrated, configuration logic 70 includes register 120, which stores P, a measure of prediction accuracy. Register 120 is coupled to incrementdecrement unit (IDU) 122, which is in turn coupled to branch resolve logic 124. Branch resolve logic 124 causes IDU 122 to increment the value stored within register 120 in response to a determination that a resolution received from branch control unit 52 matches a previous prediction read out from PHT 62. Conversely, branch resolve logic 124 causes IDU 122 to decrement the value P stored within register 120 in response to a misprediction. The value P saturates at $P_{MAX}$ when incremented, where $P_{MAX}$ is a maximum number of correctly predicted branches that can be represented within register 120, and at zero when decremented. Register 120 is further coupled to comparator 126, which signals selection logic 128 in response to a determination that the value P stored in register 120 is less than a threshold value T stored in register 130.

Branch resolve logic 124 is further coupled to IDU 140 which increments or decrements the value N stored in register 142 in response to receipt of a corresponding signal from branch resolve logic 124. The value N stored in register 142 serves as an up/down counter of the number of speculative branch instructions executed utilizing the current value of i stored in length register 64. The value N is passed to comparators 144 and 146 to determine if N is less than $N_{MAX}$, a predetermined maximum number of speculative branches, and greater than zero, respectively. The outputs of comparators 144 and 146 are coupled to selection logic 128. If branch resolve logic 124 is incrementing the value N stored in register 142 in response to each branch prediction, selection logic 128 switches the operation performed by IDU 50 on the value i stored in length register 64 in response to receipt of signals indicating that $N<N_{MAX}$ and $P<T$. Conversely, if branch resolve logic 124 is counting down N in response to each branch prediction, selection logic 128 switches the operation performed by IDU 150 in response to signals indicating that $N>0$ and $P<T$.

Figure 6:
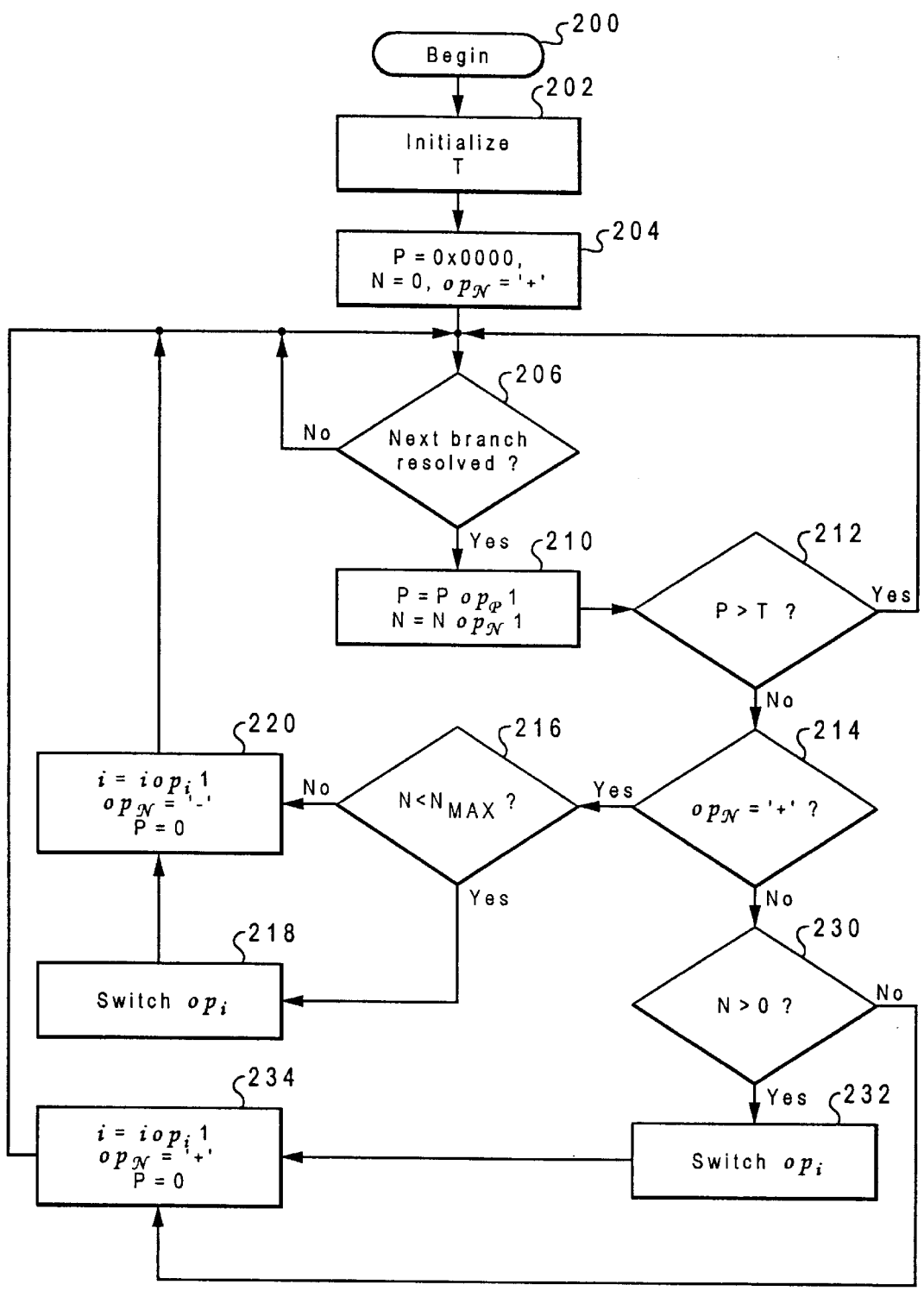
FIG. 6 is a flowchart of a method implemented by the configuration logic depicted in FIG. 5 for dynamically configuring the branch prediction unit of the processor illustrated in FIG. 1.

Referring now to FIG. 6, there is depicted a flowchart of the heuristic implemented by configuration logic 70 for dynamically selecting the amount of branch history utilized to predict a resolution of a speculative branch instruction. As illustrated, the process begins at block 200 and thereafter proceeds to block 202, which illustrates initializing T, the threshold value stored in register 130. Threshold value T is preferably set to a value indicative of the lowest acceptable prediction accuracy permitted prior to changing the configuration of PHT 62. The process proceeds from block 202 to block 204, which depicts setting both P and N to zero. In addition, $op_N$, the operation performed by branch resolve logic 124 and IDU 140 on the value N, is set to increment.

The process proceeds from block 204 to block 206, which illustrates a determination by branch resolve logic 124 whether or not a resolution of a branch instruction has been received from branch control unit 52. If not, the process simply iterates at block 206 until a branch resolution is received. In response to receipt of a branch resolution from branch control unit 52, the process passes from block 206 to block 210, which illustrates branch resolve logic 124 updating the values P and N utilizing the respective operators for each value. Thus, when the updating operations illustrated at block 210 are first performed, the value within register 142 is incremented by IDU 140 and the value of register 120 is incremented or decremented depending upon whether or not the resolved branch instruction was correctly predicted. Next, a determination is made at block 212 by comparator 126 whether or not P, the prediction accuracy value, is greater than the threshold value T. If so, the process returns to block 206, which has been described.

However, in response to a determination at block 212 that $P<T$, a determination is made at block 214 whether or not the value N is currently being incremented by branch resolve logic 124. If so, the process passes to block 216, which depicts a determination by comparator 144 whether or not the value N stored in register 142 is less than $N_{MAX}$. If not, the process passes to block 220. However, in response to a determination that $N<N_{MAX}$, the process proceeds to block 218, which illustrates selection logic 128 switching the state of $op_i$, the operation performed by IDU 150 on the value i stored in length register 64. The process then proceeds from block 218 to block 220, which illustrates selection logic 128 causing IDU 150 to increment or decrement i depending upon the state of $op_i$. In addition, branch resolve logic 124 switches the state of $op_N$ from increment to decrement and sets P, the measure of prediction accuracy, equal to zero. Thereafter, the process returns to block 206, which has been described.

Referring again to block 214, if a determination is made that the state of op$_N$ is set to decrement, the process passes to block 230, which depicts a determination by comparator 146 whether or not N is greater than zero. If not, the process passes to block 234. However, in response to a determination by comparator 146 that N>O, the process proceeds from block 230 to block 232, which illustrates selection logic 128 switching the state of op$_i$. The process then proceeds to block 234, which depicts selection logic 128 causing IDU 150 to increment or decrement the value i stored in length register 64 in accordance with the state of op$_i$. In addition, branch resolve logic 124 switches the state of op$_N$ from decrement to increment and sets the value P to zero. Thereafter, the process returns to block 206 in the manner which has been described.

An illustrative embodiment of a processor has been described which includes a branch prediction unit that is selectively configurable to provide enhanced branch prediction accuracy. As described with reference to FIGS. 4 and 6, the amount of branch history utilized to predict branch resolutions may be set either statically prior to execution of a program or dynamically during execution of the program. Although the particular illustrative embodiment hereinbefore described implements a two-level branch prediction methodology that predicts branch resolutions utilizing a first-level global branch history and a second-level configurable pattern history, those skilled in the art will appreciate that other branch prediction mechanisms may alternatively be employed. Moreover, although in the described illustrative embodiment only the storage for the second level of branch history is configurable, those skilled in the art will appreciate that a heuristic similar to the one described above can also be implemented to configure the storage for the first level branch history.

While an illustrative embodiment has been particularly shown and described, it will be understood by those skilled in the art that various changes in form and detail may be made therein without departing from the spirit and scope of the illustrative embodiment.

What is claimed is:

1. A method within a processor of speculatively executing a branch instruction, said processor including a branch prediction unit, said method comprising:

storing a plurality of branch predictions, wherein each of said plurality of branch predictions has an associated bit pattern;

detecting a speculative branch instruction;

in response to a detection of a speculative branch instruction, deriving each bit within an access bit pattern from a source among a plurality of sources, wherein bits within said access bit pattern are derived from two or more sources among said plurality of sources;

accessing one of said plurality of branch predictions utilizing said access bit pattern; and in response to said accessed branch prediction, calculating a target address.

2. The method of claim 1, and further comprising the step of storing branch history of at least one previously executed branch instruction.

3. The method of claim 2, wherein said plurality of sources include an address of said speculative branch instruction and said branch history of at least one previously executed branch instruction.

4. The method of claim 1, and further comprising the step of automatically determining a source among said plurality of sources for each bit within said access bit pattern.

5. The method of claim 4, wherein said step of automatically determining a source among said plurality of sources for each bit within said access bit pattern is performed dynamically during execution of instructions.

6. The method of claim 4, wherein said step of automatically determining a source among said plurality of sources for each bit within said access bit pattern is performed in response to an indication of branch prediction accuracy.

7. A processor, comprising;

means for storing a plurality of branch predictions, wherein each of said plurality of branch predictions has an associated bit pattern;

means for detecting a speculative branch instruction;

means for deriving each bit within an access bit pattern from a source among a plurality of sources in response to a detection of a speculative branch instruction, wherein bits within said access bit pattern are derived from two or more sources among said plurality of sources;

means for accessing one of said plurality of branch predictions utilizing said access bit pattern; and means for calculating a target address in response to said accessed branch prediction.

8. The processor of claim 7, and further comprising means for storing branch history of at least one previously executed branch instruction.

9. The processor of claim 8, wherein said plurality of sources include an address of said speculative branch instruction and said branch history of at least one previously executed branch instruction.

10. The processor of claim 7, and further comprising means for automatically determining a source among said plurality of sources for each bit within said access bit pattern.

11. The processor of claim 10, wherein said means for automatically determining a source among said plurality of sources for each bit within said access bit pattern comprises means for dynamically determining a source among said plurality of sources for each bit within said access bit pattern during execution of instructions.

12. The processor of claim 10, wherein said means for automatically determining a source among said plurality of sources for each bit within said access bit pattern determines a source among said plurality of sources for each bit within said access bit pattern in response to an indication of branch prediction accuracy.

13. A processor, comprising:

branch history storage for storing branch history of at least one previously executed branch instruction;

a branch prediction unit for predicting a resolution of a speculative branch instruction, wherein said branch prediction unit is selectively configurable such that resolution of said speculative branch instruction is predicted in response to an address of said speculative branch instruction and in response to said branch history of at least one previously executed branch instruction; and an address calculation unit for determining a target address in response to said predicted resolution of said speculative branch instruction.

14. The processor of claim 13, wherein said branch prediction unit is further selectively configurable such that resolution of said speculative branch instruction is predicted in response to said address of said speculative branch instruction and said branch history of at least one previously executed branch instruction.

15. The processor of claim 14, and further comprising branch prediction storage for storing a plurality of predicted resolutions of branch instructions, wherein each of said plurality of predicted resolutions has an associated bit pattern.

16. The processor of claim 15, wherein said branch prediction unit determines a predicted resolution of said speculative branch instruction by selecting a particular bit pattern among said plurality of bit patterns in accordance with a selected configuration of said branch prediction unit.

17. The processor of claim 16, wherein a first number of bits within said particular bit pattern are selected bits within said address of said speculative branch instruction and a second number of bits within said particular bit pattern are indicative of said branch history of at least one previously executed branch instructions.

18. The processor of claim 13, and further comprising means for automatically configuring said branch prediction unit.

19. The processor of claim 18, wherein said means for automatically configuring said branch prediction unit comprises configuration logic for dynamically configuring said branch prediction logic.

20. The processor of claim 19, said configuration logic including an indication of branch prediction accuracy, wherein said configuration logic automatically configures said branch prediction unit in response to said indication of branch prediction accuracy.

21. The method of claim 2, wherein storing branch history of at least one previously executed branch instruction comprises:

storing branch history of K most recently executed branch instructions in a global branch history register.

22. The processor of claim 8, and wherein said means for storing branch history of at least one previously executed branch instruction comprises:

a global branch history register that stores branch history of K most recently executed branch instructions.

23. The processor of claim 13, wherein said branch history storage for storing branch history of at least one previously executed branch instruction comprises a global branch history register that stores branch history of K most recently executed branch instructions.

* * * * *